US006120955A

United States Patent [19]

Tokutake et al.

[11] Patent Number: 6,120,955

[45] Date of Patent: Sep. 19, 2000

[54] SUBSTRATE FOR PHOTOSENSITIVE MEMBER, PHOTOSENSITIVE MEMBER, PRODUCTION METHOD THEREOF AND IMAGE FORMING APPARATUS USING THE PHOTOSENSITIVE MEMBER

[75] Inventors: Shigeaki Tokutake, Takatsuki; Teiko Yamaguchi, Kawanishi; Keiichi Inagaki, Itami; Mitsutoshi Sakamoto, Osaka, all of Japan

[73] Assignee: Minolta Co., Ltd., Osaka, Japan

[21] Appl. No.: 09/105,214

[22] Filed: Jun. 26, 1998

[30] Foreign Application Priority Data

| | | | |
|---|---|---|---|
| Jun. 27, 1997 | [JP] | Japan | 9-171590 |
| Feb. 24, 1998 | [JP] | Japan | 10-041931 |

[51] Int. Cl.$^7$ .......... G03G 5/10; G03G 15/10; B32B 15/04

[52] U.S. Cl. .......... 430/65; 430/56; 430/67; 430/69; 430/127; 430/131; 399/159; 428/472.2; 205/204; 148/275; 148/276; 148/283

[58] Field of Search .......... 430/64, 65, 56, 430/60, 69, 131, 127, 57.1, 67; 205/203, 204; 148/275, 276, 283; 428/472.2; 399/159, 116

[56] References Cited

U.S. PATENT DOCUMENTS

| | | | |
|---|---|---|---|
| 4,800,144 | 1/1989 | Ueda et al. | 430/65 |
| 5,132,196 | 7/1992 | Hirayama et al. | 430/63 |
| 5,225,068 | 7/1993 | Bartkowski et al. | 205/203 |
| 5,328,790 | 7/1994 | Asano et al. | 430/65 |
| 5,504,558 | 4/1996 | Ikezue | 430/56 |
| 5,783,344 | 7/1998 | Kobayashi et al. | 430/65 |
| 5,891,269 | 4/1999 | Koerner et al. | 205/203 |
| 5,923,925 | 7/1999 | Nakamura et al. | 430/67 |

FOREIGN PATENT DOCUMENTS

| | | | |
|---|---|---|---|
| 19832082 | 1/1999 | Germany . | |
| 63-214759 | 9/1988 | Japan . | |
| 63-311260 | 12/1988 | Japan . | |
| 1-312554 | 12/1989 | Japan | 430/65 |

OTHER PUBLICATIONS

Japio Abstract AN 1989–312554 of JP 01312554, published Mar. 2, 1990, of Japio Copyright 2000 JPO.

Patent & Trademark Office English–Language Translation of JP 1–312554 (Pub. Dec. 1989).

Grant, R. et al, ed. Grant & Hackh's Chemical Dictionary, Fifth Edition, McGraw–Hill Co., NY (1987), p. 499.

Japio Abstract AN 89–312554 of JP 1–312554 (Pub Dec. 1989).

Derwent Abstract 90–034006/05 of JP1–312554 (Pub Dec. 1989).

Derwent Abstract Acc No.: 1999–097198 of DE 19832082 (Pub Jan. 1999).

*Primary Examiner*—Janis L. Dote
*Attorney, Agent, or Firm*—McDermott, Will & Emery

[57] ABSTRACT

An electrophotographic photosensitive member is provided which does not involve any image noise occurrence, such as black spot or white spot under any environment. The electrophotographic photosensitive member comprises a photoreceptor substrate including an anodized layer formed on the surface of an aluminum or aluminum alloy base, the anodized layer having been sealed by a low temperature sealing treatment and a high temperature sealing treatment, and at least one photosensitive layer formed on the photoreceptor substrate.

27 Claims, 1 Drawing Sheet

SUBSTRATE FOR PHOTOSENSITIVE MEMBER, PHOTOSENSITIVE MEMBER, PRODUCTION METHOD THEREOF AND IMAGE FORMING APPARATUS USING THE PHOTOSENSITIVE MEMBER

This application is based on applications Ser. Nos.171590/1997 and 41931/1998 filed in Japan, each content of which is hereby incorporated by reference.

BACKGROUND OF THE INVENTION

1. Field of the Invention

The present invention relates to a substrate for photosensitive member, a photosensitive member, a production method thereof and an image forming apparatus using the same.

2. Description of the Prior Art

Electrophotography has made good progress in the area of copying machines, and has recently rapidly gained popularity because of good characteristic features it can provide, such as high image quality, high speed processing, and quiet operation, which are of such a high level as is beyond comparison with the prior art. More particularly, with remarkable progress made in the area of data processing systems for digital signals, laser beam printers, digital copying machines, and the like have been receiving high attention. Image forming methods which have been employed in such apparatuses include not only those adopting conventional regular development system such that an image is formed by causing toner to adhere to a portion other than portions irradiated with a light beam, but also methods of a reversal development system designed for effective light beam utilization and/or resolving-power improvement such that toner is caused to adhere to portions irradiated with light beams, such as laser beams, for image formation.

Photosensitive members used in aforesaid electrophotographic apparatuses generally comprise a substrate of such electrically conductive material as aluminum or aluminum alloy, and a photosensitive layer formed on the substrate. For the photosensitive layer a functionally separated lamination type layer structure is widely used such that a charge generating layer and a charge transporting layer are sequentially placed on an electrically conductive substrate. Such a photosensitive member involves a problem such that charge injection from the conductive substrate into the charge generating layer may occur at the stage of development, resulting in image noise troubles, that is, so-called black spots such that a toner image is formed at a spot at which any toner image is not to be formed, and/or so-called white spots such that no toner image is formed at a spot at which a toner image is required to be formed. For preventing the occurrence of such a trouble, it is general practice to provide an anodized layer by anodizing the surface of the substrate. However, with a photosensitive layer formed on such a substrate having an anodized layer, the trouble is that no smooth transfer of electrical charge from the photosensitive layer to the anodized layer could be achieved. As a consequence, the characteristics of the photosensitive layer are adversely affected. Furthermore, because of an increase in the surface area of the substrate due to the anodizing treatment, impurities in the treatment liquid or cleaning fluid may deposit on the substrate, resulting in a recurrence of the problem of black spots and/or white spots.

In such situation, U.S. Pat. No. 4,800,144 gives a teaching that an anodized surface of the photoreceptor substrate is subjected to sealing treatment with an aqueous solution of nickel acetate at a temperature of 50 to 80° C. Japanese Patent Application Laid-Open No. Sho 63-214759 discloses a method in which an anodized surface of the photoreceptor substrate is subjected to sealing treatment with an aqueous solution of nickel fluoride at a temperature of 25 to 40° C. In Japanese Patent Application Laid-Open No. Sho 63-311260 there is given a teaching that an anodized surface of the photoreceptor substrate is subjected to low-temperature sealing with an aqueous solution of red prussiate or the like at 40° C. or less. However, in these methods, sealing treatment is made in one stage only; as such, the foregoing problem has not been completely solved.

SUMMARY OF THE INVENTION

The object of the invention is to provide an electrophotographic photosensitive member which does not involve any imaging noise occurrence, such as black spots or white spots under any environmental conditions.

According to the invention, there is provided a photosensitive member comprising:

a substrate for electrophotography in which an anodized layer is formed on the surface of the substrate formed of aluminum or aluminum alloy, the anodized layer being sealed by a low temperature sealing treatment and a high temperature sealing; and a photosensitive layer.

According to the invention, there is also provided an image forming apparatus comprising:

a photosensitive member comprising a substrate including an anodized layer formed on the surface of the substrate formed of aluminum or aluminum alloy, the anodized layer being sealed by a low temperature sealing treatment and a high temperature sealing, and a photosensitive layer;

a contact charging device operative to contact the surface of the photosensitive member to charge the photosensitive member;

a developing device for developing with toner an electrostatic latent image supported on the surface of the photosensitive member; and a transfer device for transferring to a transfer medium a toner image supported on the surface of the photosensitive member.

DETAILED DESCRIPTION OF THE INVENTION

Figure 1:
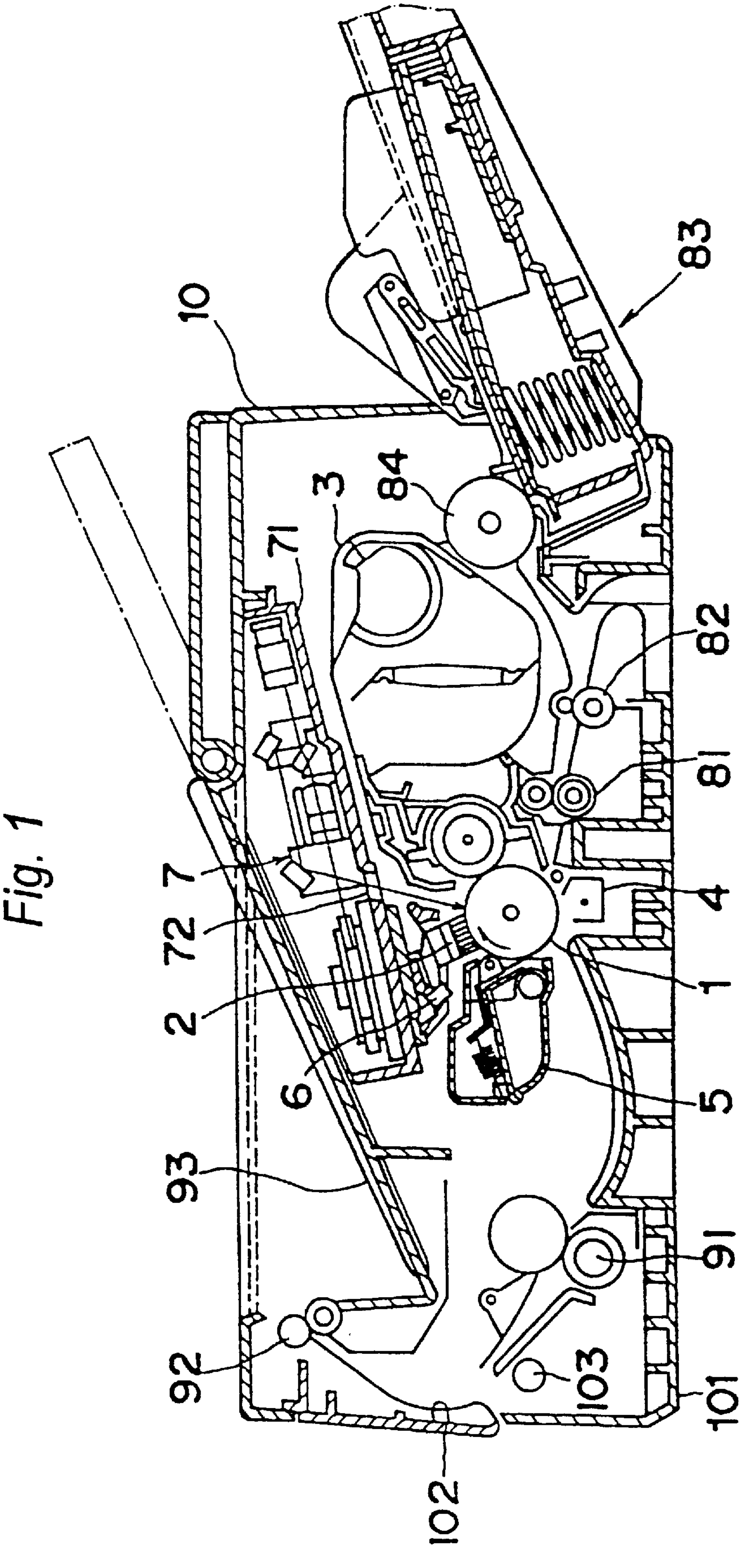
FIG. 1 is a schematic view of an image forming apparatus (printer) equipped with a contact charging device.

The present invention relates to an electrophotographic photosensitive member comprising a photoreceptor substrate including an anodized layer formed on the surface of an aluminum or aluminum alloy base, the anodized layer having been passed through the steps of low temperature sealing and high temperature sealing; and at least one photosensitive layer formed on the photoreceptor substrate.

The present invention also relates to an electrophotographic image forming apparatus including at least means for charging the surface of a photosensitive member, means for developing a latent image with toner, and means for transferring a toner image to a transfer medium, the photosensitive member comprising a photoreceptor substrate including an anodized layer formed on the surface of an aluminum or aluminum alloy base, the anodized layer having been passed through the steps of low temperature sealing and high temperature sealing, and at least one photosensitive layer formed on the photoreceptor substrate, the means for charging the photosensitive member being means operative to contact the surface of the photosensitive member thereby to charge electrically the photosensitive member.

In the present invention, the surface of an aluminum or aluminum alloy base is first anodized, and the anodized surface is then subjected to two-stage sealing treatment, that is, low temperature sealing and high temperature sealing. In this way, an electrophotographic photosensitive member is obtained which has a photosensitive layer formed on a photoreceptor substrate. The use of such photosensitive member makes it possible to provide high-quality images which do not involve the problem of image noise, such as black spots, under any environmental conditions.

The type of aluminum or aluminum alloy for use as a base material for the substrate of a photosensitive member of the present invention is not particularly limited. Any type of aluminum or aluminum alloy which has been conventionally used can be used for the purpose of the invention. However, if the grain size of a different metal present in the aluminum alloy is relatively large, a thin oxidized layer portion is produced which tends to lower the resistance value, thus allowing easy injection of charge from the base material into the photosensitive layer. Therefore, it is desirable to use an aluminum alloy material such that the grain size of a different metal present therein is relatively small.

Generally, anodization in the present invention may be carried out in an acid bath, such as chromic acid, sulfuric acid, oxalic acid, boric acid, or sulfamic acid, by employing a known method. In the invention, anodization in a sulfuric acid bath is most preferable. In the case of anodization in a sulfuric acid bath, it is desirable that the concentration of sulfuric acid be set within the range of 100 to 300 g/l, preferably 100 to 200 g/l, the concentration of dissolved aluminum within the range of 2 to 15 g/l, the bath temperature within the range of 15 to 30° C., preferably 10 to 30° C., and the electrolytic voltage within the range of 5 to 20 V, preferably 10 to 20 V. Further, in the present invention, from the standpoint of image quality it is desirable that anodizing be carried out at a low current density of the order of 0.3 to 1.5 A/$dm^2$, preferably 0.6 to 1.2 A/$dm^2$, more preferably 0.7 to 1.1 A/$dm^2$, for a comparatively long time period of the order of 10 minutes or more, preferably 15 to 60 minutes.

It is desirable that the thickness of the anodized layer be 1 to 15 $\mu$m, preferably 2 to 10 $\mu$m, more preferably 4 to 8 $\mu$m. If the thickness is less than 1 $\mu$m, the anodized layer, as a charge injection preventive layer, is degraded in function. Whilst, a thickness of more than 15 $\mu$m only results in a cost increase; therefore, any larger layer thickness is not required.

The anodized layer is subjected to the process of sealing, because a porous portion of the anodized layer is still in unstable condition. Generally, the resistance of the anodized layer is enhanced by sealing the layer, so that further improvement can be achieved in the preventive function (blocking function) of the anodized layer against charge injection.

According to the present invention, sealing is carried out in two stages, that is, low-temperature sealing and high-temperature sealing. The sequence of the two sealing steps are not particularly defined; however, it is desirable that low-temperature sealing be carried out first, and then high-temperature sealing be carried out. The reason for this is that the porous portion formed on the anodized surface is filled at the bottom thereof by low-temperature sealing, and is narrowed when a portion adjacent the entrance of the porous portion is closed by high-temperature sealing. It is believed, therefore, that sealing treatment can be more smoothly performed when sealing is made in such a sequence that pore bottom is filled first and then pore entrance is narrowed.

The term "low-temperature sealing" used herein means a sealing treatment performed by immersing an anodized layer in a treating liquid at a temperature of not higher than 40° C. Other sealing conditions are same as those used in known methods. The treating liquid is made to contain a low-temperature sealing agent, such as nickel fluoride or red prussiate, when so required.

Specifically, where nickel fluoride is used as a low-temperature sealing agent, an aqueous solution containing 2 to 7 g/l, preferably 3 to 6 g/l, of nickel fluoride is conditioned to pH 5.0 to 6.0 and a temperature of 20 to 40° C., preferably 20 to 35° C., and low-temperature sealing is performed by immersing a photoreceptor substrate having above described anodized layer in the so conditioned aqueous solution for 1 to 15 minutes, preferably 2 to 15 minutes. If the temperature is lower than 20° C., the aqueous solution is poorly diffused, and this will result in reduced sealing effect and reduced blocking effect of the sealed substrate surface, which may be a cause of fogging when voluminous copying is made. If the temperature is higher than 40° C., the bond between the photoreceptor substrate and the photosensitive layer formed thereon will be lowered, resulting in reduced sealing effect and poor blocking performance, which may be a cause of fogging when voluminous copying is made.

Where red prussiate is used as a low-temperature sealing agent, an aqueous solution containing 3 to 20 g/l, preferably 10 to 20 g/l, of red prussiate is conditioned to pH 5.5 to 6.0 and a temperature range of 25 to 40° C., preferably 25 to 35° C., and low-temperature sealing is performed by immersing a photoreceptor substrate having above described anodized layer in the so conditioned aqueous solution for 1 to 20 minutes, preferably 5 to 15 minutes. If the temperature is lower than 25° C., the aqueous solution is poorly diffused, and this will result in reduced sealing effect and reduced blocking effect of the sealed substrate surface, which may be a cause of fogging when voluminous copying is made. If the temperature is higher than 40° C., the bond between the photoreceptor substrate and the photosensitive layer formed thereon will be lowered, resulting in reduced sealing effect and reduced blocking effect, which may be a cause of fogging when voluminous copying is made.

In addition to the case where a low-temperature sealing agent is used as above said for low-temperature sealing purposes, low-temperature sealing may be carried out by other sealing methods including, for example, vapor sealing method using pure water and moisture sealing method. Vapor sealing is carried out by allowing the photoreceptor substrate to stand under a pressure of 3.0 to 6.0 kg/$cm^2$ and at a temperature of 30 to 40° C. for 10 to 30 minutes, preferably 20 to 30 minutes. Moisture sealing is carried out by allowing the photoreceptor substrate to stand for 1 to 10 days under the conditions of relative humidity, 80% or more, and temperature, 30 to 40° C.

The anodized layer which has been low-temperature sealed in this way is then subjected to high-temperature sealing. In this case it is desirable that the low-temperature sealed anodized layer be washed with running pure water before it is subjected to high-temperature sealing.

The term "high-temperature sealing" used herein means a sealing treatment performed by immersing an anodized layer in a treating liquid at a temperature of not lower than 65° C. Other sealing conditions are same as those used in known methods. The treating liquid is made to contain a high-temperature sealing agent, for example, a metallic salt, such as nickel acetate, cobalt acetate, lead acetate, nickel-cobalt acetate, or barium acetate, when so required. Of these metallic salts, nickel acetate is most preferable for use as such.

Specifically, where nickel acetate is used as a high-temperature sealing agent, an aqueous solution containing 3 to 20 g/l, preferably 4 to 12 g/l, of nickel acetate is conditioned to pH 5.5 to 6.0 and a temperature of 65 to 100° C., preferably 80 to 98° C., and high-temperature sealing is performed by immersing a photoreceptor substrate having above described low-temperature sealed, anodized layer in the so conditioned aqueous solution for 5 to 40 minutes, preferably 10 to 30 minutes. If the temperature is lower than 65° C., the sealing effect of the sealed substrate surface is lowered and the blocking effect of the sealed substrate is also lowered, which may be a cause of fogging when voluminous copying is made. The use of a temperature higher than 100° C. is not realistic because it virtually leads to increased costs of equipment and other item. Further, the bond between the photoreceptor substrate and the photosensitive layer formed thereon will be lowered, resulting in reduced sealing effect and poor blocking performance, which may be a cause of fogging when voluminous copying is made. Where any metallic salt other than nickel acetate, such as cobalt acetate, lead acetate, nickel-cobalt acetate, or barium acetate, is used, high-temperature sealing is carried out in the same way as in the case where nickel acetate is used.

In addition to the case where a high-temperature sealing agent is used as above said for high-temperature sealing purposes, high-temperature sealing may be carried out by other sealing methods including, for example, hot water sealing method and vapor sealing method using pure water. Hot water sealing is carried out by immersing the photoreceptor substrate in hot water at a temperature of 65 to 100° C., preferably 90 to 98° C., for 10 to 60 minutes, preferably 20 to 40 minutes. Vapor sealing is carried out by allowing the photoreceptor substrate to stand under a water vapor pressure of 3.0 to 6.0 kg/cm$^2$ and at a temperature of 95 to 98° C. for 10 to 30 minutes, preferably 10 to 20 minutes.

It is desirable that the sealing of the anodized layer on the substrate surface be carried out in the sequence of low-temperature sealing and high-temperature sealing. However, the two-stage anodizing may be carried out reverse way. In that case, specific procedures and conditions in respective ways of sealing are as earlier described.

On a photoreceptor substrate formed in manner as above described is formed a photosensitive layer according to a known method. The photosensitive layer may be of a configuration such that a charge generating layer and a charge transporting layer are sequentially laid, or such that a charge transporting layer and a charge generating layer are sequentially laid, or may be of a single layer form including a charge transporting material and a charge generating material.

The description to follow pertains to the fabrication of a photosensitive member which comprises a photosensitive layer formed by laying a charge generating layer and a charge transporting layer in sequential order.

The charge generating layer is formed by vacuum deposition of a charge generating material, or by coating such a material dissolved in a solvent, such as amine, or by coating a coating liquid prepared by dispersing a pigment in a suitable solvent, or if necessary, in a coating liquid having a binder resin dispersed therein, then drying the coating. Then, a solution containing a charge transporting material and a binder resin is coated on the charge generating layer and the coated layer is then dried, the charge transporting layer being thus formed.

Charge generating materials for use in the photosensitive member of the invention include, for example, organic materials, such as bis-azo pigments, trisazo pigments, triaryl methane dyes, thiazine dyes, oxazine dyes, xanthene dyes, cyanine pigments, styryl dyes, pyrilium dyes, azo dyes, Qunacridone dyes, indigo dyes, perylene dyes, polycyclic quinone pigments, bis-benzimidazole pigments, indanthrone pigments, squalilium pigments, and phthalocyanine pigments Other materials may also be used as long as they are light absorptive and can generate charge carriers at a very high efficiency.

For the charge transporting material to be used in the photosensitive member of the invention, organic materials are preferred. Examples of such organic materials are hydrazone compounds, pyrazoline compounds, styryl compounds, triphenyl methane compounds, oxadiazole compounds, carbazole compounds, stilbene compounds, enamine compounds, oxazole compounds, triphenylamine compounds, tetraphenyl benzidine compounds, and azine compounds.

The binder resin to be used in the production of such a photosensitive member as described above is electrically insulative and preferably has a volume resistance of $1\times10^{12}$ Ω·cm or more as measured alone. For example, binder materials known per se in the art, such as thermoplastic resins, thermosetting resins, photosetting resins, and photoconductive resins, may be used. More specifically, thermoplastic resins, such as polyester resin, polyamide resin, acrylic resin, ethylene-vinyl acetate resin, ion cross-linked olefin copolymer (ionomer), styrene-butadiene block-copolymer, polycarbonate, vinyl chloride-vinyl acetate copolymer, cellulose ester, polyimide, and styrol resin; thermosetting resins, such as epoxy resins, urethane resins, silicone resins, phenolic resins, melamine resins, xylene resins, alkyd resins, and thermosetting acrylic resins; photosetting resins; and photoconductive resins, such as polyvinyl carbazole, polyvinyl pyrene, polyvinyl anthracene, and polyvinyl pyrrole. These binder resins may be used each alone or in a combination of two or more kinds.

Where the charge transporting material per se is a polymeric charge transporting material usable as a binder, other binder resins may not necessarily be used.

A photosensitive member of the invention may comprise, together with the binder resin, a plasticizer, such as halogenated paraffin, poly (biphenyl chloride), dimethyl naphthalene, dibutylphthalate, or o-ter-phenyl; an electron absorptive sensitizer, such as chloranil, tetracyano-ethylene, 2, 4, 7-trinitrofluorenone, 5, 6-dicyano benzoquinone, tetracyano-quinodimethane, tetrachlorophthalic anhydride, or 3, 5-dinitrobenzoate; and a sensitizer, such as methyl violet, Rhodamine B, cyanine dye, beryllium salt, or thiaberyllium salt.

The photosensitive member of the invention may have an intermediate layer formed on the anodized layer which has been low-temperature sealed and high-temperature sealed as already described. Materials suitable for use in forming the intermediate layer are: nylon resins, polyimide resins, polyamide resins, nitrocellulose poly(vinyl butyral) resins, and polyvinyl alcohol resins. The thickness of the intermediate layer is 0.1 to 30 μm, preferably 1 to 30 μm, more preferably 1 to 20 μm.

The photosensitive member of the invention may include a surface protection layer of 0.1 to 10 $\mu$m in thickness formed on the photosensitive layer. Materials suitable for use in making the surface protection layer are resins such as acrylic resins, polyarylate resins, polycarbonate resins, and urethane resins.

The surface protection layer may be loaded with inorganic fillers and organic fine particles for adjustment of surface hardness and/or roughness.

Inorganic fillers usable for the purpose of the present invention include metallic oxides, such as silica, titanium oxide, zinc oxide, calcium oxide, aluminum oxide, and zirconium oxide; metallic sulfides, such as barium sulfate and calcium sulfate; and metallic nitrides, such as silicon nitride, aluminum nitride, and mixtures thereof. Preferable of these are silica, titanium oxide, and aluminum oxide.

Examples of organic fine particles are fine particles of various kinds of resins, such as fluorinated resins, silicone resins, acrylic resins, and olefin resins, and mixtures of such resins. More specifically, fine particles of fluororesins, such as polytetrafluoroethylene and poly (vinylidene fluoride), and olefin resins, such as polyethylene and polypropylene, are preferably mentioned as such.

Such fine particles are preferably spherical in shape and have a mean particle size or major diameter of 0.05 to 2.0 $\mu$m, preferably 0.05 to 1.0 $\mu$m. If the particle size is less than 0.05 $\mu$m, the surface of the photosensitive layer has no sufficient mechanical strength required of it and will tend to wear away and get damaged in the course of repetitive image formation, thus resulting in unsatisfactory electrophotographic performance. If the particle size is more than 2 $\mu$m, the surface roughness of the photosensitive layer becomes larger, which may be a cause of unsatisfactory cleaning.

The quantity of such fine particles should be up to 50% by weight, preferably 5 to 35% by weight, relative to the total weight of the surface layer. If the fine-particle content is more than 50% by weight, the sensitivity of the photosensitive member will be lowered, and this poses a problem such that a residual potential rise will occur during voluminous copying, thus causing fogging.

An organic plasma polymeric layer may be used as the surface protection layer. The organic plasma polymeric layer may contain oxygen, nitrogen, halogen, and atoms of groups 3 and 5 of the periodic table as required.

By selecting a suitable photosensitive layer, the photosensitive member of the invention can be effectively used in either reversal development system or regular development system while retaining the advantageous effect of the invention. However, it is particularly preferable to use the photosensitive member in apparatuses of the reversal development system.

Apparatuses into which the photosensitive member produced in manner as above described can be incorporated include, but are not limited to, full-color, color and monochromatic copying machines, printers and leader printers. The photosensitive member is not particularly limited in configuration, but may be, for example, of drum form, belt form, or plate form.

Further, the photosensitive member, formed with a surface protective layer, of the present invention is suitable for use in a copying system including a charging member operative to charge the surface of a photosensitive layer while in contact with the surface, that is, an electrophotographic image forming apparatus comprising at least means for charging the surface of a photosensitive member, means for developing an exposed image with toner, means for transferring a developed image to a transfer medium, and means operative to carry out post-transfer cleaning, wherein the charging means is a contact charging means operative to charge through contact with the surface of the photosensitive member. Various forms of charging members usable for incorporation into such an apparatus are known in the art, including brush form, blade form, film form, and roller form. Such charging members are such that a resistance adjuster agent, such as carbon black, carbon fiber, metallic powder, metallic whisker, or metallic oxide, is dispersed in a resin mass, such as rayon, nylon, vinylon, polyurethane, polyester, polyethylene, polypropylene, polyvinyl chloride, or ethylene fluoride.

In FIG. 1, a schematic view of an image forming apparatus (printer) equipped with a contact charging device is shown.

The printer as shown in FIG. 1 is provided with the photoreceptor drum 1 of the embodiment at the central portion thereof. The photoreceptor drum 1 is rotated clockwise as indicated by an arrow a by a driving means (not shown). A fixed type brush charger 2, a developing device 3, a transfer charger 4, a cleaning device 5, and an eraser 6 are sequentially disposed around the periphery of the photoreceptor drum 1.

An optical system 7 accommodated in a housing 71 is disposed above the photoreceptor drum 1. The optical system 7 comprises a semiconductor laser generating device, a polygon mirror, a toroidal lens, a half mirror, a spherical mirror, a return mirror, and a reflecting mirror, although not particularly indicated. An exposure slit 72 is formed on the lower surface of the housing 71 so that the image of an original document is exposed to the photoreceptor drum 1 through the charging device 2 and the developing device 3.

At the right of the photoreceptor drum 1 of FIG. 1, a set of timing rollers 81, a set of intermediate rollers 82, and a paper supply cassette 83 are sequentially disposed. A paper supply roller 84 is disposed adjacently to the paper supply cassette 83. At the left of the photoreceptor drum 1 of FIG. 1, a set of fixing rollers 91 and a set of paper discharge rollers 92 are disposed. A paper discharge tray 93 is disposed adjacently to the paper discharge rollers 92.

The main body 10 of the printer accommodates all of the above-described components. The main body 10 comprises a lower unit 101 and an upper unit 102. The upper unit 102 accommodates the charger 2, the developing device 3, the cleaning device 5, the eraser 6, the optical system 7, the upper roller of the set of the timing rollers 81, the upper roller of the set of the intermediate roller 82, the paper supply roller 84, the upper roller of the set of the fixing rollers 91, the paper discharge roller 92, and the paper discharge tray 93. The upper unit 102 is pivotable about a shaft 103, i.e., the end portion of the paper supply side can be opened to remove jammed paper from the printer and perform maintenance and repair work.

The brush of the charger 2 was brought into contact with the surface of the photosensitive drum 1 by pressing the brush against the surface of the photoreceptor drum 1.

Mono-component developer mainly including toner of a negatively charging type was used by the developing device 3.

According to the printer shown in FIG. 1, the surface of the photoreceptor drum 1 is charged by the brush charger 2 at a predetermined electric potential and the optical system 7 exposes the image of the original document in the charging region of the surface of photoreceptor drum 1 to form an electrostatic latent image thereon. The electrostatic latent image thus formed is developed into a toner image by the developing device 3 and the toner image arrives at the transfer region confronting the transfer charger 4.

Meanwhile, copy paper is drawn out from the paper supply cassette 83 by the paper supply roller 84 and then, arrives at the set of the timing rollers 81 through the set of the intermediate rollers 82. Then, the copy paper is transported into the transfer region in synchronization with the toner image disposed on the photoreceptor drum 1. In this manner, the toner image is transferred onto the copy paper by the action of the transfer charger 4. Then, the copy paper is fed to the set of the fixing rollers 91 at which the toner image is fixed to the copy paper. Thereafter, the copy paper is discharged onto the paper discharge tray 93 by the set of the paper discharge rollers 92.

After the toner image is transferred to the copy paper, toner which has remained on the photoreceptor drum 1 is cleaned by the cleaning device 5 and residual charge is erased by the eraser 6.

Following examples are given to further illustrate the present invention.

EXAMPLE 1

A cylinder-shaped aluminum alloy metal of JIS 5005 (outer diameter, 100 mm; length, 350 mm; thickness 1.0 mm) was subjected to surface cutting by a cutting tool using natural diamond as a cutting edge. The aluminum alloy metal so cut was degreased with a degreasing agent (surface active agent) at 60±5° C. for 5 minutes, then washed with running water. Then, the metal surface was etched with 10 g/l of nitric acid for 2 minutes, followed by running water washing with pure water. Next, anodization was carried out using 150 g/l of sulfuric acid as an electrolyte for 25 minutes and under the conditions of: electrolytic voltage, 18 V, current density, 0.8 $A/dm^2$; liquid temperature, 20° C., Thus, a 7 $\mu$m thick anodized layer was formed.

After having been washed with running pure water, the anodized layer was subjected to low-temperature sealing with an aqueous solution (concentration, 15 g/l; pH, 5.8) of a low-temperature sealing agent comprising red prussiate as a principal component (CS-1; made by Clariant K. K.), at 30° C. for 10 minutes. Next, after having been washed with running pure water, the low-temperature sealed layer was subjected to high-temperature sealing with an aqueous solution (concentration, 7 g/l; pH, 5.8) of a high-temperature sealing agent comprising nickel acetate as a principal component (DX-500; made by Okuno Seiyaku Kogyo K. K.), at 85° C. for 20 minutes. After pure-water washing, the sealed layer was allowed to dry and a photoreceptor substrate was thus obtained.

Whilst, 1 part by weight of τ type metal phthalocyanine ("LIOPHOTON", made by Toyo Ink Seizo K. K.) and 0.5 part by weight of polyvinyl butyral resin ("S-LEC BX-1", made by Sekisui Kagaku K. K.), together with 50 parts by weight of tetrahydrofuran (THF), were dispersed by means of a sand mill. The resulting phthalocyanine dispersion was applied to the photoreceptor substrate so as to give a post-drying film thickness of 0.3 $\mu$m. A charge generating layer was thus formed.

A coating liquid was coated on the charge generating layer, the coating liquid comprising 10 parts by weight of a triphenyl amine compound expressed by the formula:

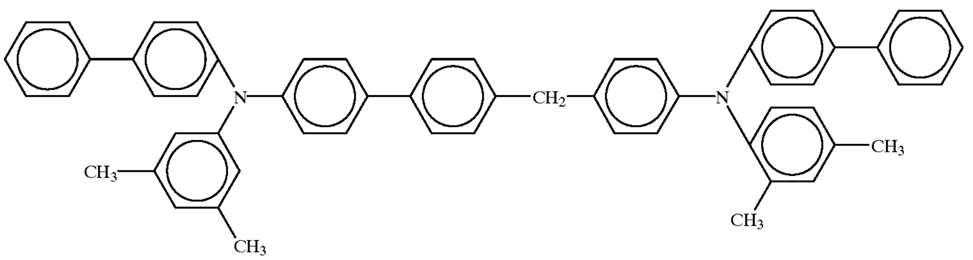

and 10 parts by weight of a polycarbonate resin ("PANLITE K-1300" made by Teijin Kasei K. K.), and 180 parts by weight of dichloromethane in which the styryl compound and polycarbonate resin were dispersed. The coating was then dried to form a charge transporting layer having a thickness of 24 $\mu$m. Thus, an electrophotographic photosensitive member was made.

EXAMPLE 2

An electrophotographic photosensitive member was prepared in the same way as in EXAMPLE 1, except that a cylinder-shaped aluminum alloy metal of JIS 5657 (outer diameter, 100 mm; length, 350 mm, thickness, 1 mm) was used instead of the alloy metal used in EXAMPLE 1, and that at the low-temperature sealing stage, low-temperature sealing was carried out using an aqueous solution (concentration, 5 g/l; pH, 5.5) of a sealing agent comprising nickel fluoride as a principal component (L-100; made by Okuno Seiyaku Kogyo K. K.), at 25° C. for 5 minutes.

EXAMPLE 3.

An electrophotographic photosensitive member was prepared in the same way as in EXAMPLE 2, except that a cylinder-shaped aluminum alloy metal of JIS 6063 (outer diameter, 100 mm; length, 350 mm, thickness, 1 mm) was used instead of the alloy metal used in EXAMPLE 2.

EXAMPLE 4

An electrophotographic photosensitive member was prepared in the same way as in EXAMPLE 1, except that low-temperature sealing was carried out after high-temperature sealing was carried out, high-temperature sealing was carried out with pure water (hot water) at 95° C. for 30 minutes, and that at the low-temperature sealing stage, low-temperature sealing was carried out using an aqueous solution (concentration, 4 g/l; pH, 5.5) of a sealing agent comprising nickel fluoride as a principal component (CS-N; made by Clarient Japan), at 30° C. for 10 minutes.

EXAMPLE 5

A photoreceptor substrate was prepared in the same way as in EXAMPLE 2. A photosensitive layer was formed on the photoreceptor substrate in the following way and an electrophotographic photosensitive member was thus obtained.

0.45 part by weight of a trisazo compound expressed by the following formula:

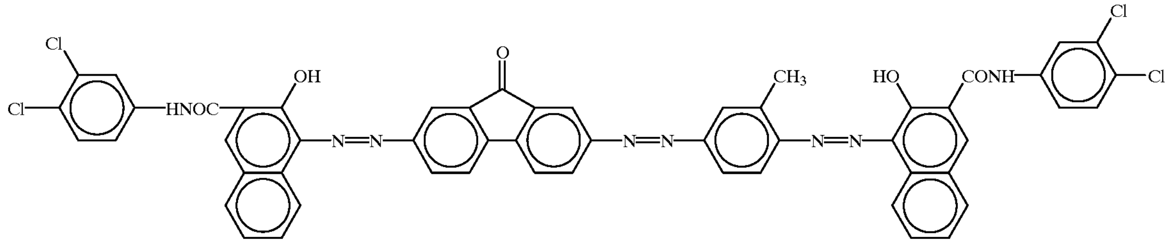

0.25 part by weight of a butyral resin ("S-LEC BX-1", made by Sekisui Kagaku K. K.), and 0.25 part by weight of phenoxy resin ("PKHH", made by Union Carbide K. K.) were dispersed, together with 50 parts by weight of cyclohexanone, by a sand mill for 48 hours.

The resulting coating dispersion of trisazo compound was coated on the photoreceptor substrate so as to give a dry thickness of 0.4 $g/m^2$, whereby a charge generating layer was formed.

40 parts by weight of a distyryl compound expressed by the following formula:

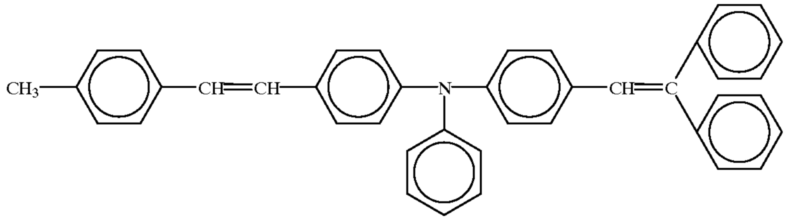

60 parts by weight of polycarbonate resin (TS-2050, made by Teijin Kasei K. K.), and 6 parts by weight of dibutyl hydroxytoluene were dissolved in 400 parts by weight of dichloromethane. The resulting solution was coated on the charge generating layer, and then the coating was dried to form a charge transporting layer having a thickness of 28 μm. An electrophotographic photosensitive member was thus obtained.

EXAMPLE 6

An electrophotographic photosensitive member was prepared in the same way as in EXAMPLE 5, except that a cylinder-shaped aluminum alloy metal of JIS 6063 (outer diameter, 100 mm; length, 350 mm, thickness, 1 mm) was used instead of the alloy metal used in EXAMPLE 5.

COMPARATIVE EXAMPLE 1

An electrophotographic photosensitive member was prepared in the same way as in EXAMPLE 1, except that high-temperature sealing was not carried out.

COMPARATIVE EXAMPLE 2

An electrophotographic photosensitive member was prepared in the same way as in EXAMPLE 1, except that low-temperature sealing was not carried out.

COMPARATIVE EXAMPLE 3

An electrophotographic photosensitive member was prepared in the same way as in EXAMPLE 2, except that high-temperature sealing was not carried out.

COMPARATIVE EXAMPLE 4

An electrophotographic photosensitive member was prepared in the same way as in EXAMPLE 3, except that low-temperature sealing was not carried out.

COMPARATIVE EXAMPLE 5

An electrophotographic photosensitive member was prepared in the same way as in EXAMPLE 5, except that low-temperature sealing was not carried out.

Black Spot Evaluation

Electrophotographic photosensitive members obtained in EXAMPLES 1–4 and COMPARATIVE EXAMPLES 1–4 were respectively mounted in full-color copying machine ("CF80", made by Minolta K. K.; light source wavelength, 0.78 μm; maximum quantity of light, 12.5 $erg/cm^2$), and the copying machines were modified so as to exhibit a system speed of 109 mm/sec. Four developing units of the copying machine were all supplied with pure black toner, and white solid image copying was made through 4-time superposition with black toner. With respect to initial copy and a copy made after 1000 time repetitive copying, the number of black spots in an image area of 25 $mm^2$ was visually counted. Evaluation was made to be ranked as follows. It is noted that the foregoing copying was made in different environments, that is, low temperature/low humidity (10° C., 15% RH), medium temperature/medium humidity (23° C., 45% RH), and high temperature/high humidity (30° C., 85% RH), and evaluation was made for performance in all such environments.

○: 14 or less;

Δ: 15 to 29;

x : 30 or more

The results of the foregoing evaluation are shown in Table 1.

TABLE 1

| | Evalution | | | | | |
|---|---|---|---|---|---|---|
| | 10° C., 15% RH | | 23° C., 45% RH | | 30° C., 85% RH | |
| | Initial | After 1000 copies | Initial | After 1000 copies | Initial | After 1000 copies |
| Ex. 1 | ○ | ○ | ○ | ○ | ○ | Δ |
| Ex. 2 | ○ | ○ | ○ | ○ | ○ | ○ |
| Ex. 3 | ○ | ○ | ○ | ○ | ○ | Δ |
| Ex. 4 | ○ | Δ | ○ | ○ | ○ | Δ |
| Comp. Ex. 1 | Δ | x | Δ | x | Δ | x |
| Comp. Ex. 2 | Δ | Δ | Δ | Δ | Δ | x |
| Comp. Ex. 3 | Δ | Δ | ○ | Δ | ○ | x |
| Comp. Ex. 4 | x | x | x | x | x | x |

White Spot Evaluation

Electrophotographic photosensitive members obtained in EXAMPLES 5–6 and COMPARATIVE EXAMPLE 5 were respectively mounted in copying machines ("EP9765", made by Minolta K. K.), and black solid image copying was made using black toner. With respect to initial copy and a copy made after 200,000 time repetitive copying, the number of white spots in an image area of 25 $mm^2$ was visually counted. Evaluation was made according to the following criterion. The foregoing copying was made in different environments, that is, low temperature/low humidity (10° C., 15% RH), medium temperature/medium humidity (23° C., 45% RH), and high temperature/high humidity (30° C., 85% RH), and evaluation was made for performance in all such environments.

◎: zero

○: 1 to 14;

Δ: 15 to 29;

x: 30 or more

Evaluation results are shown in Table 2.

TABLE 2

| | Evalution | | | | | |
|---|---|---|---|---|---|---|
| | 10° C., 15% RH | | 23° C., 45% RH | | 30° C., 85% RH | |
| | Initial | After 200,000 copies | Initial | After 200,000 copies | Initial | After 200,000 copies |
| Ex. 5 | ◎ | ◎ | ◎ | ◎ | ◎ | ◎ |
| Ex. 6 | ◎ | ○ | ◎ | ○ | ◎ | Δ |
| Comp. Ex. 5 | ◎ | Δ | ◎ | Δ | ◎ | x |

From these results it has now been made clear that by using a photosensitive member having a photosensitive layer formed on a photoreceptor substrate which is obtained by carrying out low-temperature sealing and high-temperature sealing after anodization, it is possible to provide good images free from the trouble of image noise, such as black spots or white spots, and to obtain satisfactory results whichever may be carried out first, low-temperature sealing or high-temperature sealing.

It has also been made clear that by suitably selecting the photosensitive layer to be formed on the substrate, the photosensitive member of the invention can be effectively employed in both the reversal development system and the regular development system, and can provide good images free of black spots or white spots under any environmental conditions.

Monolayer Photosensitive Member

EXAMPLE 7

A cylinder-shaped aluminum alloy metal of JIS 6063 (outer diameter, 50 mm; length, 254 mm; thickness 1.0 mm) was subjected to surface cutting by a cutting tool using natural diamond as a cutting edge. The aluminum alloy metal 60 cut was degreased with 30 g/l of surface active agent "Top Alclean 161", a degreasing agent, at 60±5° C. for 5 minutes, then washed with running water.

The washed aluminum substrate was immersed in a 100 g/l nitric acid solution for 5 minutes and etched therein, followed by running water washing with pure water.

Next, anodization was carried out using 150 g/l of sulfuric acid as an electrolyte for 25 minutes and under the conditions of: current density, 1 A/$dm^2$; liquid temperature, 20° C., Thus, a 7 μm thick anodized layer was formed. After having been washed with running pure water, the aluminum substrate, with oxidized layer formed thereon, was subjected to low-temperature sealing with a 6 g/l aqueous solution (pH, 5.7) of a sealing agent comprising nickel fluoride as a principal component (CS-N; made by Clariant K. K.), at 30° C. for 5 minutes.

Next, after having been washed with running pure water, the low-temperature sealed substrate was subjected to high-temperature sealing with pure water at95° C. for 30 minutes. After pure-water washing, the treated substrate was washed with pure water and allowed to dry.

A solution prepared by dissolving 50 parts by weight of a butadiene compound expressed by the following formula:

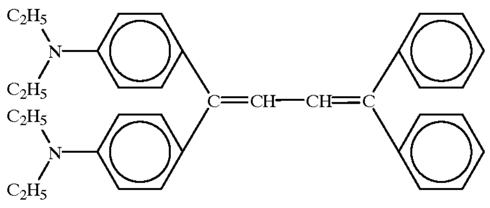

and 50 parts by weight of polycarbonate ("PANLITE K 1300", made by Teijin Kasei K. K.), and 2.5 parts by weight of thiapyrilium salt (TP, made by Hodogaya Kagaku K. K.) expressed by the following formula:

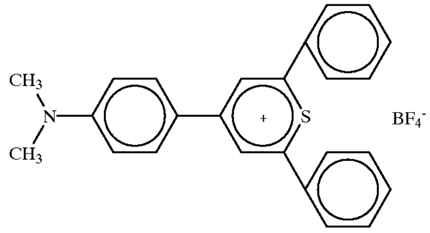

in 400 parts by weight of dichloromethane was coated on the anodized layer so as to give a dry thickness of 18 μm. A photosensitive layer was thus formed.

Evaluation

The photosensitive member obtained was mounted in a commercially available leader printer ("RP603Z", made by Minolta K. K.), and black solid image copying was made using black toner. With respect to initial copy and a copy made after 1,000 time repetitive copying, number of white spots in an image area of 25 $mm^2$ was visually counted. Evaluation was made according to the following criterion. The foregoing copying was made in different environments, that is, low temperature/low humidity (10° C., 15% RH), medium temperature/medium humidity (23° C., 45% RH), and high temperature/high humidity (30° C., 85% RH), and evaluation was made for performance in all such environments.

◎: zero

○: 1 to 14;

Δ: 15 to 29;

x: 30 or more

COMPARATIVE EXAMPLE 6

An electrophotographic photosensitive member of the invention was prepared in the same way as in EXAMPLE 7, except that instead of low-temperature sealing, high-temperature sealing was carried out using an aqueous solution (pH 5.6) of 5 g/l high-temperature sealing agent containing nickel acetate (Sealing Salt AS, made by Clariant Japan K. K.) at 95° C. for 20 minutes. The photosensitive member obtained was evaluated in the same way as in the case of EXAMPLE 7.

The results are shown in Table 3 below.

TABLE 3

| | 10° C., 15% RH | | 23° C., 45% RH | | 30° C., 85% RH | |
|---|---|---|---|---|---|---|
| | Initial | After 1000 copies | Initial | After 1000 copies | Initial | After 1000 copies |
| Ex. 7 | ◎ | ◎ | ◎ | ◎ | ◎ | ○ |
| Comp. Ex. 6 | ◎ | Δ | ◎ | Δ | ○ | x |

The washed aluminum substrate was immersed in 100 g/l nitric acid solution metal surface and was etched therein for 5 minutes, followed by running water washing with pure water.

Next, anodization was carried out using 150 g/l of sulfuric acid as an electrolyte for 15 minutes and under the conditions of: current density, 1 $A/dm^2$; liquid temperature, 20° C. Thus, an 8 μm thick anodized layer was formed.

After having been washed with running pure water, the aluminum substrate on which was formed an oxidized layer was subjected to low-temperature sealing with an aqueous solution (concentration, 6 g/l; pH, 5.7) of a sealing agent comprising nickel fluoride as a principal component (CS-N; made by Clariant Japan K. K.), at 30° C. for 5 minutes.

Next, after having been washed with running pure water, the substrate was subjected to high-temperature sealing with an aqueous solution (concentration, 10 g/l; pH, 5.8) of a high-temperature sealing agent containing nickel acetate (Sealing Salt AS; made by Clariant Japan K. K.) at 80° C. for 15 minutes.

On the photoreceptor substrate, with an anodized layer sealed in this way, was formed a photosensitive layer in the following way.

X type phthalocyanine (4.5 parts by weight) ("8120B", made by Dainippon Ink Kogyo K. K.), 2.5 parts by weight of butyral resin ("S-LEC BH-3", made by Sekisui Kagaku K. K.), and 2.5 parts by weight of phenoxy resin (PKHH, made by Union Carbide K. K.), together with 500 parts by weight of dichloroethane, were dispersed by means of a sand mill. The resulting dispersion was applied to the photoreceptor substrate so as to give a post-drying layer thickness of 0.3 μm. A charge generating layer was thus formed.

A coating liquid was coated on the charge generating layer, the coating liquid comprising 40 parts by weight of a styryl compound expressed by the formula:

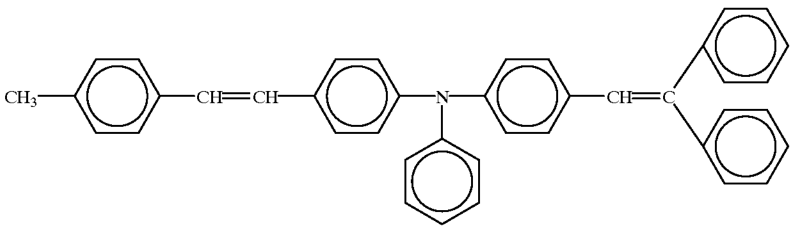

Laminated Type Photosensitive Member with Surface Protective Layer

EXAMPLE 8

A cylinder-shaped aluminum alloy substrate of JIS 6063 (outer diameter, 30 mm; length, 250 mm; thickness 1.0 mm) was subjected to surface cutting by a cutting tool using natural diamond as a cutting edge. The aluminum alloy metal so cut was degreased with 30 g/l surface active agent "TOP ALCLEAN 161" (made by Okuno Seiyaku Kogyo K. K.), a degreasing agent, at 60±5° C. for 5 minutes, then washed with running water.

and 60 parts by weight of a polycarbonate resin ("TS-2050" made by Teijin Kasei K. K.), 2 parts by weight of butylhydroxytoluene (special; made by Tokyo Kasei K. K.), which is a phenolic compound expressed by the following formula:

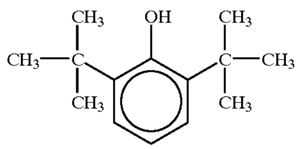

and 400 parts by weight of tetrahydrofuran to form a charge transporting layer of 20 μm.

Next, 1.5 parts by weight of styryl compound expressed by the above formula; 2 parts by weight of polycarbonate resin ("IUPILON Z800"; made by Mitsubishi Gas Kagaku K. K.), 0.3 parts by weight of phenolic compound butylhydroxytoluene (special, made by Tokyo Kasei K. K.), and 0.7 part by weight of silica fine particles (AEROSIL R972; made by Nippon Aerosil K. K.) were dispersed in 100 parts by weight of dichloromethane, and the resulting coating liquid was coated on the charge transporting layer and was allowed to dry to form a 2 $\mu$m thick surface layer. Thus, an electrophotographic photosensitive member of the invention was made.

COMPARATIVE EXAMPLE 7

An electrophotographic photosensitive member was prepared in the same as in EXAMPLE 8, except that low-temperature sealing by nickel fluoride was not carried out.

EXAMPLE 9

An electrophotographic photosensitive member was prepared in the same way as in EXAMPLE 8, except that surface protective layer was not provided.

EXAMPLE 10

An electrophotographic photosensitive member was prepared in the same way as in EXAMPLE 8, except that titanium oxide fine particles (CR90, made by Ishihara Sangyo K. K.) were used instead of silica fine particles.

EXAMPLE 11

An electrophotographic photosensitive member was prepared in the same way as in EXAMPLE 8, except that aluminum oxide fine particles (BAIKALOX CP2320, made by Baikowsky Japan K. K.) were used instead of silica fine particles.

EXAMPLE 12

An electrophotographic photosensitive member was prepared in the same way as in EXAMPLE 8, except that 1.75 parts by weight of a dispersion of polytetrafluoroethylene fine particles (KD-200AS, made by Kitamura K. K.) were used in place of silica fine particles were used instead of silica fine particles.

Evaluation

Electrophotographic photosensitive members obtained in EXAMPLES 8–12 and COMPARATIVE EXAMPLE 7 were respectively mounted in printer ("SP 101", made by Minolta K. K.) and white solid image copying was made. With respect to initial copy and a copy made after 5000 time repetitive copying, the number of black spots in an image area of 25 $mm^2$ was visually counted. Evaluation was made to be raned as follows. It is noted that the aforesaid copying was made in different environments, that is, low temperature/low humidity (10° C., 15% RH), medium temperature/medium humidity (23° C., 45% RH), and high temperature/high humidity (30° C., 85% RH), and evaluation was made for performance in all such environments.

○: 14 or less;

Δ: 15 to 29;

x: 30 or more

Measurement was also made with respect to the quantity of wear of the photosensitive member after continuous 5000 sheet copying (under high temperature/high humidity conditions).

Evaluation results are shown in Table 4 below.

TABLE 4

| | Evalution | | | | | | Wear |
|---|---|---|---|---|---|---|---|
| | 10° C., 15% RH | | 23° C., 45% RH | | 30° C., 85% RH | | Amount after |
| | Initial | After 5000 copies | Initial | After 5000 copies | Initial | After 5000 copies | 5000 copies ($\mu$m) |
| Ex. 8 | ◎ | ◎ | ◎ | ◎ | ◎ | ◎ | 1.4 |
| Ex. 9 | ◎ | ◎ | ◎ | ◎ | ◎ | Δ | 4.2 |
| Ex. 10 | ◎ | ◎ | ◎ | ◎ | ◎ | Δ | 1.4 |
| Ex. 11 | ◎ | ◎ | ◎ | ◎ | ◎ | Δ | 1.6 |
| Ex. 12 | ◎ | ◎ | ◎ | ◎ | ◎ | ◎ | 1.5 |
| Comp. Ex. 7 | Δ | Δ | Δ | Δ | Δ | x | 1.4 |

Application for Contact Charging

EXAMPLE 13

A cylinder-shaped aluminum alloy substrate of JIS 3003 (outer diameter, 30 mm; length, 250 mm; thickness 1.0 mm) was subjected to surface cutting by a cutting tool using natural diamond as a cutting edge. The aluminum alloy metal so cut was degreased with 30 g/l surface active agent "TOP ALCLEAN 161" (made by Okuno Seiyaku Kogyo K. K.), a degreasing agent, at 60±5° C. for 5 minutes, then washed with running water.

The washed aluminum substrate was immersed in 100 g/l nitric acid solution and was etched therein for 5 minutes, followed by running water washing with pure water.

Next, anodization was carried out using 150 g/l of sulfuric acid as an electrolyte for 15 minutes and under the conditions of: current density, 1 A/$dm^2$; liquid temperature, 20° C., Thus, an 8 $\mu$m thick anodized layer was formed.

After having been washed with running pure water, the aluminum substrate on which was formed an oxidized layer was subjected to low-temperature sealing with an aqueous solution (concentration, 6 g/l; pH, 5.7) of a sealing agent comprising nickel fluoride as a principal component (CS-N; made by Clariant Japan K. K.), at 30° C. for 5 minutes.

Next, after having been washed with running pure water, the substrate was subjected to sealing with an aqueous solution (concentration, 10 g/l; pH, 5.6) of a sealing agent containing nickel acetate (DX-500, made by Okuno Seiyaku Kogyo) at 80° C. for 15 minutes.

On the photoreceptor substrate, with an anodized layer sealed in this way, was formed a photosensitive layer in the following way.

X type phthalocyanine (4.5 parts by weight) ("8120B", made by Dainippon Ink Kogyo K. K.), 2.5 parts by weight of butyral resin ("S-LEC BH-3", made by Sekisui Kagaku K. K.), and 2.5 parts by weight of phenoxy resin (PKHH, made by Union Carbide), together with 500 parts by weight of dichloroethane, were dispersed by means of a sand mill. The resulting dispersion was applied to the photoreceptor substrate so as to give a post-drying film thickness of 0.3 $\mu$m. A charge generating layer was thus formed.

Next, 40 parts by weight of styryl compound used in Example 8; 60 parts by weight of polycarbonate resin (IUPILON Z800; made by Mitsubishi Gas Kagaku K. K.), 2 parts by weight of phenolic compound butylhydroxytoluene (special, made by Tokyo Kasei K. K.) used in Example 8, and 15 parts by weight of silica fine particles (AEROSIL 200CF; made by Nippon Aerosil K. K.) were dispersed in 400 parts by weight of dichloromethane, and the resulting coating liquid was coated on the charge generating layer and was allowed to dry to form a 20 μm thick carge transporting layer. Thus, an electrophotographic photosensitive member of the invention was made.

COMPARATIVE EXAMPLE 8

An electrophotographic photosensitive member was prepared in the same way as in EXAMPLE 13, except that low temperature sealing with nickel fluoride was not carried out; that high temperature sealing with nickel acetate was carried out at 90° C. for 20 minutes; and that after running water washing with pure water, boiled pure water immersion was carried out at 95° C. for 10 minutes.

COMPARATIVE EXAMPLE 9

An electrophotographic photosensitive member was prepared in the same way as in EXAMPLE 13, except that low temperature sealing with nickel fluoride was not carried out; that high temperature sealing with nickel acetate was carried out at 90° C. for 20 minutes; that after running water washing with pure water, boiled pure water immersion was carried out at 95° C. for 10 minutes; and that inorganic fine particles were not used during formation of charge generating layer.

Evaluation

Electrophotographic photosensitive members obtained in EXAMPLE 13 and COMPARATIVE EXAMPLES 8 and 9 were respectively mounted in a printer ("SP 1000", made by Minolta K. K.) adopting a contact charging system for charging of photosensitive members, and white solid image copying was made. With respect to initial copy and a copy made after 5000 time repetitive copying, the number of black spots in an image area of 25 $mm^2$ was visually counted. Evaluation was made according to the following criterion. It is noted that the aforesaid copying was made in different environments, that is, low temperature/low humidity (10° C., 15% RH), medium temperature/medium humidity (23° C., 45% RH), and high temperature/high humidity (30° C., 85% RH), and evaluation was made for performance in all such environments.

○: 14 or less;

Δ: 15 to 29;

x: 30 or more

The amount of wear of photosensitive member at the end of continuous 5,000 copying (under low temperature, low humidity conditions) was also measured.

Results are shown in Table 5 below.

TABLE 5

| | 10° C., 15% RH | | 23° C., 45% RH | | 30° C., 65% RH | | Wear |
|---|---|---|---|---|---|---|---|
| | Initial | After 5000 copies | Initial | After 5000 copies | Initial | After 5000 copies | Amount after copies 5000 (μm) |
| Ex. 13 | ⊚ | ⊚ | ⊚ | ⊚ | ⊚ | ⊚ | 3.2 |
| Comp. Ex. 8 | Δ | Δ | Δ | Δ | Δ | Δ | 3.2 |
| Comp. Ex. 9 | Δ | Δ | Δ | Δ | Δ | Δ | 7.5 |

In accordance with the invention, it is now possible to provide an electrophotographic photosensitive member which involves no possibility of image noise occurrence, such as black spots and/or white spots. The photosensitive member of the invention is effectively used in both reversal development system and regular development system by suitably selecting a photosensitive layer to be formed thereon. Further, it can exhibit high endurance.

What is claimed is:

1. A photosensitive member comprising:

a substrate in which an anodized layer is formed on the surface of the substrate formed of aluminum or aluminum alloy, the anodized layer being sealed by a low temperature sealing treatment and a high temperature sealing treatment; and a photosensitive layer;

wherein the low temperature sealing treatment is carried out by immersing the anodized layer in a treating liquid having a temperature of not higher than 40° C. and containing a low-temperature sealing agent and the high temperature sealing treatment is carried out by immersing the anodized layer in a treating liquid having a temperature of not lower than 65° C. and containing a high-temperature sealing agent, the low-temperature sealing agent being nickel fluoride or red prussiate, and the high-temperature sealing agent being nickel acetate.

2. A photosensitive member as defined in claim 1, wherein the anodized layer has a thickness of 1 to 15 μm.

3. A photosensitive member as defined in claim 1, wherein the treating liquid containing the nickel fluoride has the temperature of 20 to 40° C.

4. A photosensitive member as defined in claim 1, wherein the treating liquid containing the nickel acetate has the temperature of 65 to 100° C.

5. A photosensitive member as defined in claim 1, wherein the photosensitive layer is a monolayer containing a charge transporting material and a charge generating material.

6. A photosensitive member as defined in claim 1, wherein the photosensitive layer includes a charge generating layer and a charge transporting layer.

7. A photosensitive member as defined in claim 1, further comprising a surface protective layer containing a resin material and an inorganic filler, said resin material selected from group consisting of an acrylic resin, a polyarylate resin, a polycarbonate resin and an urethane resin.

8. A photosensitive member as defined in claim 1, further comprising a surface protective layer containing a resin material and organic fine particles having a mean particle size of 0.05 to 2 μm, said resin material selected from the group consisting of an acrylic resin, a polyarylate resin, a polycarbonate resin and an urethane resin.

9. A photosensitive member as defined in claim 1, wherein the treating liquid containing the red prussiate has the temperature of 25 to 40° C.

10. A photosensitive member comprising:

a substrate in which an anodized layer is formed on the surface of the substrate formed of aluminum or aluminum alloy, the anodized layer being sealed by a low temperature sealing treatment and a high temperature sealing treatment; and a photosensitive layer;

wherein the low temperature sealing treatment is carried out by immersing the anodized layer in a treating liquid having a temperature of not higher than 40° C. and containing a low-temperature sealing agent and the high temperature sealing treatment is carried out by immersing the anodized layer in a treating liquid having a temperature of not lower than 65° C. and containing a high-temperature sealing agent, the low-temperature sealing agent being nickel fluoride or red prussiate, and the high-temperature sealing agent being metal acetate.

11. A photosensitive member as defined in claim 10, wherein the metal acetate is selected from the group consisting of nickel acetate, cobalt acetate, lead acetate, nickel-cobalt acetate and barium acetate.

12. A photosensitive member as defined in claim 10, wherein the treating liquid containing the nickel fluoride has the temperature of 20 to 40° C.

13. A photosensitive member as defined in claim 12, wherein the treating liquid has a pH of 5.0 to 6.0.

14. A photosensitive member as defined in claim 10, wherein the treating liquid containing the red prussiate has the temperature of 25 to 40° C.

15. A photosensitive member as defined in claim 14, wherein the treating liquid has a pH of 5.5 to 6.0.

16. A photosensitive member as defined in claim 10, wherein the treating liquid containing the metal acetate has the temperature of 65 to 100° C.

17. A photosensitive member as defined in claim 16, wherein the treating liquid has a pH of 5.5 to 6.0.

18. An image forming apparatus comprising:

a photosensitive member comprising a substrate including an anodized layer formed on the surface of the substrate formed of aluminum or aluminum alloy, the anodized layer being sealed by a low temperature sealing treatment and a high temperature sealing treatment, and a photosensitive layer; wherein the low temperature sealing treatment is carried out by immersing the anodized layer in a treating liquid having a temperature of not higher than 40° C. and containing a low-temperature sealing agent and the high temperature sealing treatment is carried out by immersing the anodized layer in a treating liquid having a temperature of not lower than 65° C. and containing a high-temperature sealing agent, the low-temperature sealing agent being nickel fluoride or red prussiate, and the high-temperature sealing agent being nickel acetate;

a contact charging device operative to contact the surface of the photosensitive member to charge the photosensitive member;

a developing device for developing with toner an electrostatic latent image supported on the surface of the photosensitive member; and a transfer device for transferring to a transfer medium a toner image supported on the surface of the photosensitive member.

19. A substrate for photosensitive member, comprising:

an anodized layer is formed on the surface of the substrate formed of aluminum or aluminum alloy, the anodized layer being sealed by a low temperature sealing treatment and a high temperature sealing treatment;

wherein the low temperature sealing treatment is carried out by immersing the anodized layer in a treating liquid having a temperature of not higher than 40° C. and containing a low-temperature sealing agent and the high temperature sealing treatment is carried out by immersing the anodized layer in a treating liquid having a temperature of not lower than 65° C. and containing a high-temperature sealing agent, the low-temperature sealing agent being nickel fluoride or red prussiate, and the high-temperature sealing agent being nickel acetate.

20. A substrate for photosensitive member as defined in claim 19, wherein the treating liquid containing the nickel fluoride has the temperature of 20 to 40° C.

21. A substrate for photosensitive member as defined in claim 19, wherein the treating liquid containing the nickel acetate has the temperature of 65 to 100° C.

22. A substrate for photosensitive member as defined in claim 19, wherein the treating liquid containing the red prussiate has the temperature of 25 to 40° C.

23. A substrate for photosensitive member comprising:

a base member formed of aluminum or aluminum alloy; and an anodized layer formed on the surface of the base member and sealed by a low temperature sealing treatment and a high temperature sealing treatment;

wherein the low temperature sealing treatment is carried out by immersing the anodized layer in a treating liquid having a temperature of not higher than 40° C. and containing a low-temperature sealing agent and the high temperature sealing treatment is carried out by immersing the anodized layer in a treating liquid having a temperature of not lower than 65° C. and containing a high-temperature sealing agent, the low-temperature sealing agent being nickel fluoride or red prussiate, and the high-temperature sealing agent being metal acetate.

24. A substrate for photosensitive member as defined in claim 23, wherein the metal acetate is selected from the group consisting of nickel acetate, cobalt acetate, lead acetate, nickel-cobalt acetate and barium acetate.

25. A substrate for photosensitive member as defined in claim 23, wherein the treating liquid containing the nickel fluoride has the temperature of 20 to 40° C.

26. A substrate for photosensitive member as defined in claim 23, wherein the treating liquid containing the red prussiate has the temperature of 25 to 40° C.

27. A substrate for photosensitive member as defined in claim 23, wherein the treating liquid containing the metal acetate has the temperature of 65 to 100° C.

* * * * *